United States Patent [19]
DiGiovanni

[11] Patent Number: 5,760,975
[45] Date of Patent: Jun. 2, 1998

[54] MAGNIFICATION END CAP FOR BOTTLES

[76] Inventor: Melanie DiGiovanni, 59 Shore Dr. South, Copiague Harbor, N.Y. 11726

[21] Appl. No.: 831,899

[22] Filed: Apr. 3, 1997

[51] Int. Cl.[6] .................................................. G02B 27/02
[52] U.S. Cl. ........................................ 359/802; 359/803
[58] Field of Search .............................. 359/802, 803, 359/810, 811, 816, 819, 829

[56] References Cited

U.S. PATENT DOCUMENTS

| | | | |
|---|---|---|---|
| 4,137,863 | 2/1979 | Anglin | 116/306 |
| 4,171,753 | 10/1979 | Vreede | 221/197 |
| 4,331,381 | 5/1982 | Hunter | 359/442 |
| 4,993,460 | 2/1991 | Robinson et al. | 141/94 |
| 5,204,775 | 4/1993 | McDevitt | 359/442 |
| 5,309,279 | 5/1994 | Halstead | 359/442 |

*Primary Examiner*—Georgia Y. Epps
*Assistant Examiner*—Ricky Mack

[57] ABSTRACT

A magnification end cap for bottles including a bottle adapted for receiving pills therein. The bottle has an open upper end. A cap portion is dimensioned for coupling with the open upper end of the bottle. A magnifying glass is secured within the cap portion.

2 Claims, 2 Drawing Sheets

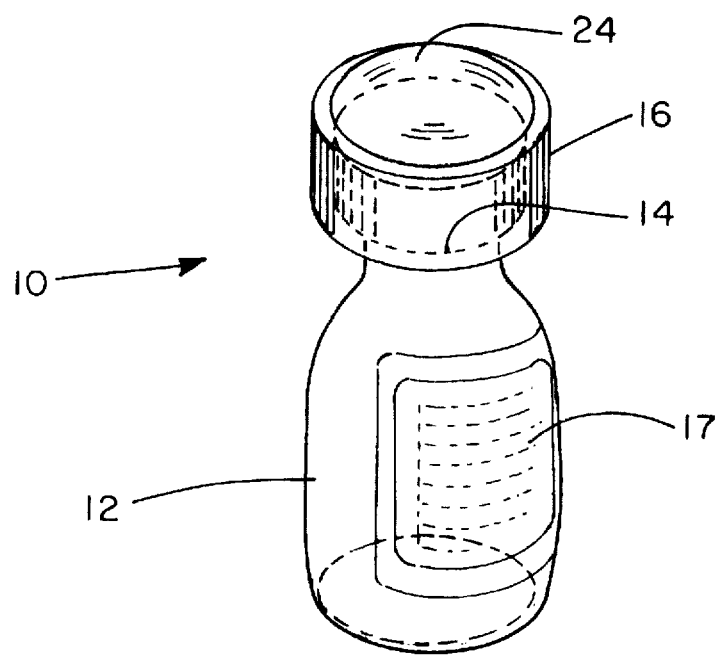
FIG. 1
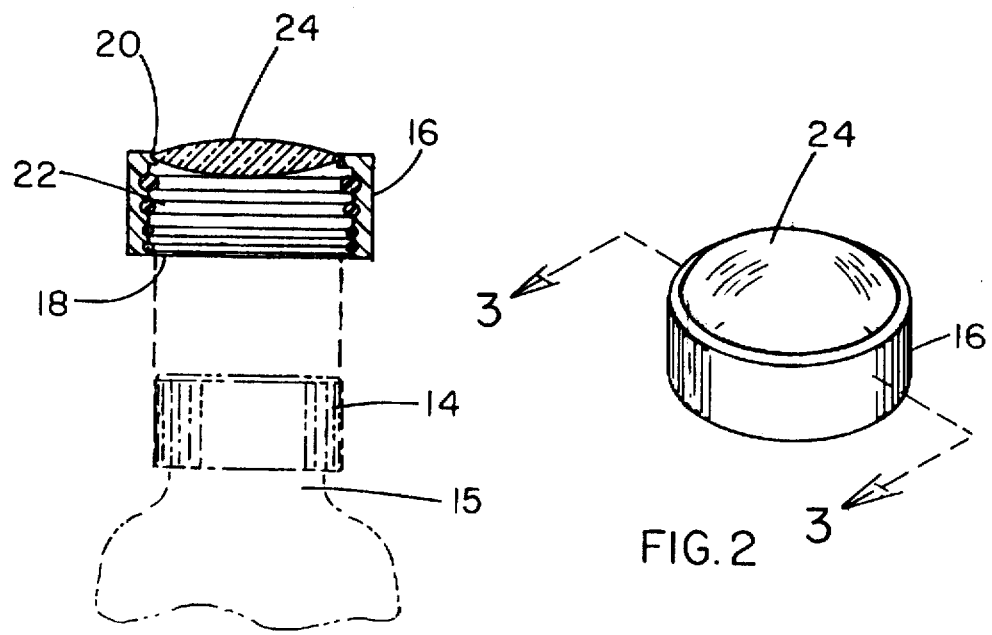
FIG. 3
FIG. 2

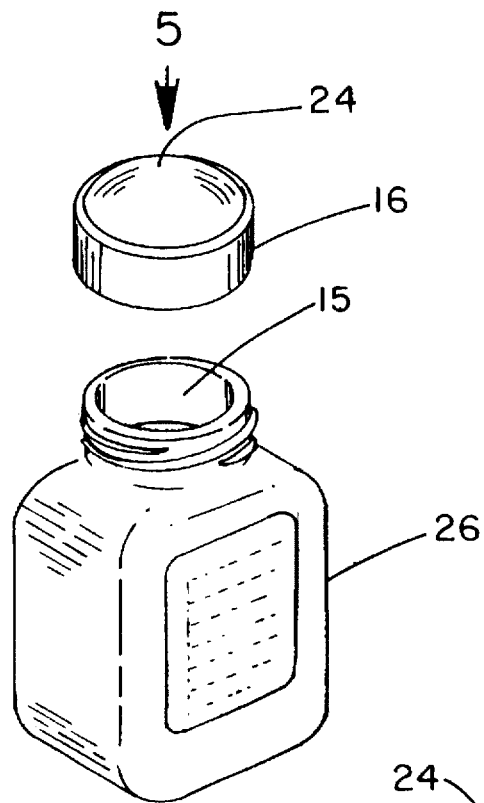
FIG. 4
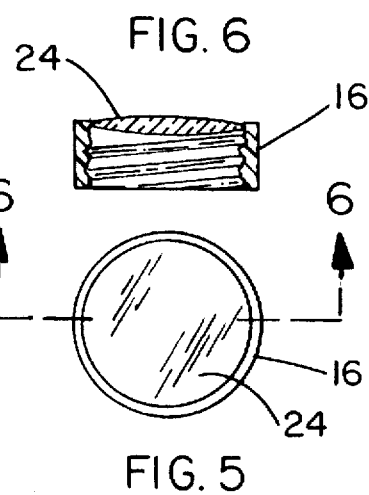
FIG. 6
FIG. 5
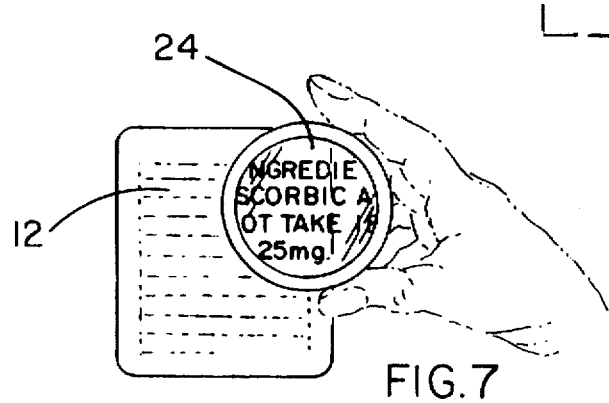
FIG. 7

MAGNIFICATION END CAP FOR BOTTLES

BACKGROUND OF THE INVENTION

1. Field of the Invention

The present invention relates to a magnification end cap for bottles and more particularly pertains to permitting magnification of difficult to read medication labels and fine print on household items with a magnification end cap for bottles.

2. Description of the Prior Art

The use of magnifying devices is known in the prior art. More specifically, magnifying devices heretofore devised and utilized for the purpose of magnifying indicia are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,204,775 to McDevitt discloses a device for magnifying indicia printed on a container.

U.S. Pat. No. 5,309,279 to Halstead discloses a script view a curved convex magnifying device.

U.S. Pat. No. 4,331,381 to Hunter discloses a magnifying device.

U.S. Pat. No. Des. 327,491 to Chandler discloses the ornamental design for a combined magnifying glasses and storage container.

U.S. Pat. No. 4,137,863 to Anglin discloses a reading instrument.

U.S. Pat. No. Des. 333,313 to Hornschu et al. discloses the ornamental design for a magnifying glass.

While these devices fulfill their respective, particular objective and requirements, the aforementioned patents do not describe a magnification end cap for bottles for permitting magnification of difficult to read medication labels and fine print on household items.

In this respect, the magnification end cap for bottles according to the present invention substantially departs from the conventional concepts and designs of the prior art, and in doing so provides an apparatus primarily developed for the purpose of permitting magnification of difficult to read medication labels and fine print on household items.

Therefore, it can be appreciated that there exists a continuing need for new and improved magnification end cap for bottles which can be used for permitting magnification of difficult to read medication labels and fine print on household items. In this regard, the present invention substantially fulfills this need.

SUMMARY OF THE INVENTION

In the view of the foregoing disadvantages inherent in the known types of magnifying devices now present in the prior art, the present invention provides an improved magnification end cap for bottles. As such, the general purpose of the present invention, which will be described subsequently in greater detail, is to provide a new and improved magnification end cap for bottles and method which has all the advantages of the prior art and none of the disadvantages.

To attain this, the present invention essentially comprises a bottle adapted for receiving pills therein. The bottle has an end cap removably coupled with an open upper end thereof. The device includes a cap portion having an open lower end and an open upper end. The cap portion is internally threaded. The cap portion has a plurality of O-rings disposed within the internal threads. The open lower end of the cap portion is dimensioned for positioning over the end cap of the bottle. A magnifying glass is secured within the open upper end of the cap portion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved magnification end cap for bottles which has all the advantages of the prior art magnifying devices and none of the disadvantages.

It is another object of the present invention to provide a new and improved magnification end cap for bottles which may be easily and efficiently manufactured and marketed.

It is a further object of the present invention to provide a new and improved magnification end cap for bottles which is of durable and reliable construction.

An even further object of the present invention is to provide a new and improved magnification end cap for bottles which is susceptible of a low cost of manufacture with regard to both materials and labor, and which accordingly is then susceptible of low prices of sale to the consuming public, thereby making such a magnification end cap for bottles economically available to the buying public.

Even still another object of the present invention is to provide a new and improved magnification end cap for bottles for permitting magnification of difficult to read medication labels and fine print on household items.

Lastly, it is an object of the present invention to provide a new and improved magnification end cap for bottles including a bottle adapted for receiving pills therein. The bottle has an open upper end. A cap portion is dimensioned for coupling with the open upper end of the bottle. A magnifying glass is secured within the cap portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the magnification end cap for bottles constructed in accordance with the principles of the present invention.

FIG. 2 is a top perspective view of the present invention.

FIG. 3 is a cross-sectional view as taken along line 3—3 of FIG. 2.

FIG. 4 is a perspective view of a second embodiment of the present invention illustrated in use.

FIG. 5 is a top plan view of the second embodiment of the present invention.

FIG. 6 is a cross-sectional view as taken along line 6—6 of FIG. 5.

FIG. 7 is a front view of the present invention illustrated in use.

The same reference numerals refer to the same parts through the various figures.

DESCRIPTION OF THE PREFERRED EMBODIMENT

With reference now to the drawings, and in particular, to FIGS. 1 through 7 thereof, the preferred embodiment of the new and improved magnification end cap for bottles embodying the principles and concepts of the present invention and generally designated by the reference number 10 will be described.

Specifically, it will be noted in the various Figures that the device relates to a magnification end cap for bottles for permitting magnification of difficult to read medication labels and fine print on household items. In its broadest context, the device consists of a bottle, a cap portion and a magnifying glass. Such components are individually configured and correlated with respect to each other so as to attain the desired objective.

The device 10 includes a bottle 12 adapted for receiving pills therein. The bottle has an end cap 14 removably coupled with an open upper end 15 thereof. Alternatively, the bottle in use could be for household cleaners or any other type bottle having an instruction label 17 affixed thereto.

Next, the device includes a cap portion 16 having an open lower end 18 and an open upper end 20. The cap portion is internally threaded. The cap portion has a plurality of O-rings 22 disposed within the internal threads. The open lower end of the cap portion is dimensioned for positioning over the end cap of the bottle. The O-rings, fabricated of rubber, will grip the end cap, yet allow the cap portion to be easily removed for use, and replaced for storage. Note FIG. 3. The cap portion can be sized to accommodate various sizes of bottle caps.

A magnifying glass 24 is secured within the open upper end of the cap portion. The magnifying glass will allow for the fine print on labels of medications or other household products to be read.

A second embodiment of the present invention is shown in FIGS. 4–6 and includes substantially all of the components of the present invention except that the cap portion 16 is prefitted for a specific bottle 26 whereby the standard cap is no longer needed. Note FIG. 4. The plurality of O-rings are now no longer necessary so as to allow for the cap portion to be screwed onto the open upper end of the bottle. Simply remove the cap portion from the bottle and hold the magnifying glass up against the label for augmentation and easy reading. Note FIG. 7.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A magnification end cap for bottles comprising:

a bottle adapted for receiving pills therein, the bottle having an open upper end;

a cap portion dimensioned for coupling with the open upper end of the bottle;

a magnifying glass secured within the cap portion; and a supplemental cap positioned between the cap portion and the open upper end of the bottle.

2. The magnification end cap for bottles as set forth in claim 1 and further including a plurality of O-rings disposed within the cap portion for engagement with the supplemental cap.

* * * * *